(12) United States Patent
Shimizu

(10) Patent No.: US 8,553,134 B2
(45) Date of Patent: Oct. 8, 2013

(54) IMAGER PROCESSING A CAPTURED IMAGE

(75) Inventor: Saki Shimizu, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 241 days.

(21) Appl. No.: 12/886,918

(22) Filed: Sep. 21, 2010

(65) Prior Publication Data

US 2011/0075016 A1    Mar. 31, 2011

(30) Foreign Application Priority Data

Sep. 29, 2009  (JP) ................................ 2009-224147

(51) Int. Cl.
```
H04N 5/232     (2006.01)
H04N 5/238     (2006.01)
H04N 9/64      (2006.01)
H04N 5/228     (2006.01)
G03B 17/00     (2006.01)
G03B 3/00      (2006.01)
G06K 9/00      (2006.01)
G06K 9/36      (2006.01)
```
(52) U.S. Cl.
USPC ........ 348/345; 348/365; 348/649; 348/222.1; 348/652; 396/79; 396/104; 382/169; 382/237; 382/118

(58) Field of Classification Search
USPC .................. 348/365, 30, 587, 592, 649, 703, 348/E0.04, 208.12, 326, 222.1, 221.1, 362, 348/239, 806, 745, 345–356, 237, 245, 496, 348/652; 396/79, 80, 82, 89, 93, 102, 103, 396/296, 287, 104; 382/169, 118, 237; 345/591, 589, 600
See application file for complete search history.

(56) References Cited

U.S. PATENT DOCUMENTS

```
6,351,606   B1 *  2/2002  Yamazaki .................. 396/61
8,026,974   B2 *  9/2011  Ishijima .................. 348/346
2004/0012682 A1 * 1/2004  Kosaka et al. .......... 348/207.99
2007/0146536 A1 * 6/2007  Lemoine ................. 348/362
2009/0027414 A1 * 1/2009  Vaughn .................. 345/603
2009/0046197 A1 * 2/2009  Ishijima ................. 348/346
```

FOREIGN PATENT DOCUMENTS

```
JP    5-95501       4/1993
JP    2000-13647    1/2000
JP    2004-12497    1/2004
JP    2004-40712    2/2004
JP    2008-306404   12/2008
```

OTHER PUBLICATIONS

Japan Office action, dated Jun. 4, 2013 along with an english translation thereof.

* cited by examiner

*Primary Examiner* — Nhan T Tran
*Assistant Examiner* — Marly Camargo
(74) *Attorney, Agent, or Firm* — Greenblum & Bernstein, P.L.C.

(57) ABSTRACT

An endoscope is provided having an imaging sensor, a focusing lens, and an image processor. The imaging sensor converts an optical image to an output image signal. The focusing lens focuses on an object. The image processor calculates a contrast value based on the image signal while the focusing lens moves to focus on an object, and in the case where the image processor detects a region in which the amount of variation in the contrast value is within a predetermined range, while the focusing lens moves in a close range around a focusing point the image processor processes at least one output image in which either the image has been cropped to exclude the region, an ornament has been added to the region, or the region has been softened.

20 Claims, 6 Drawing Sheets

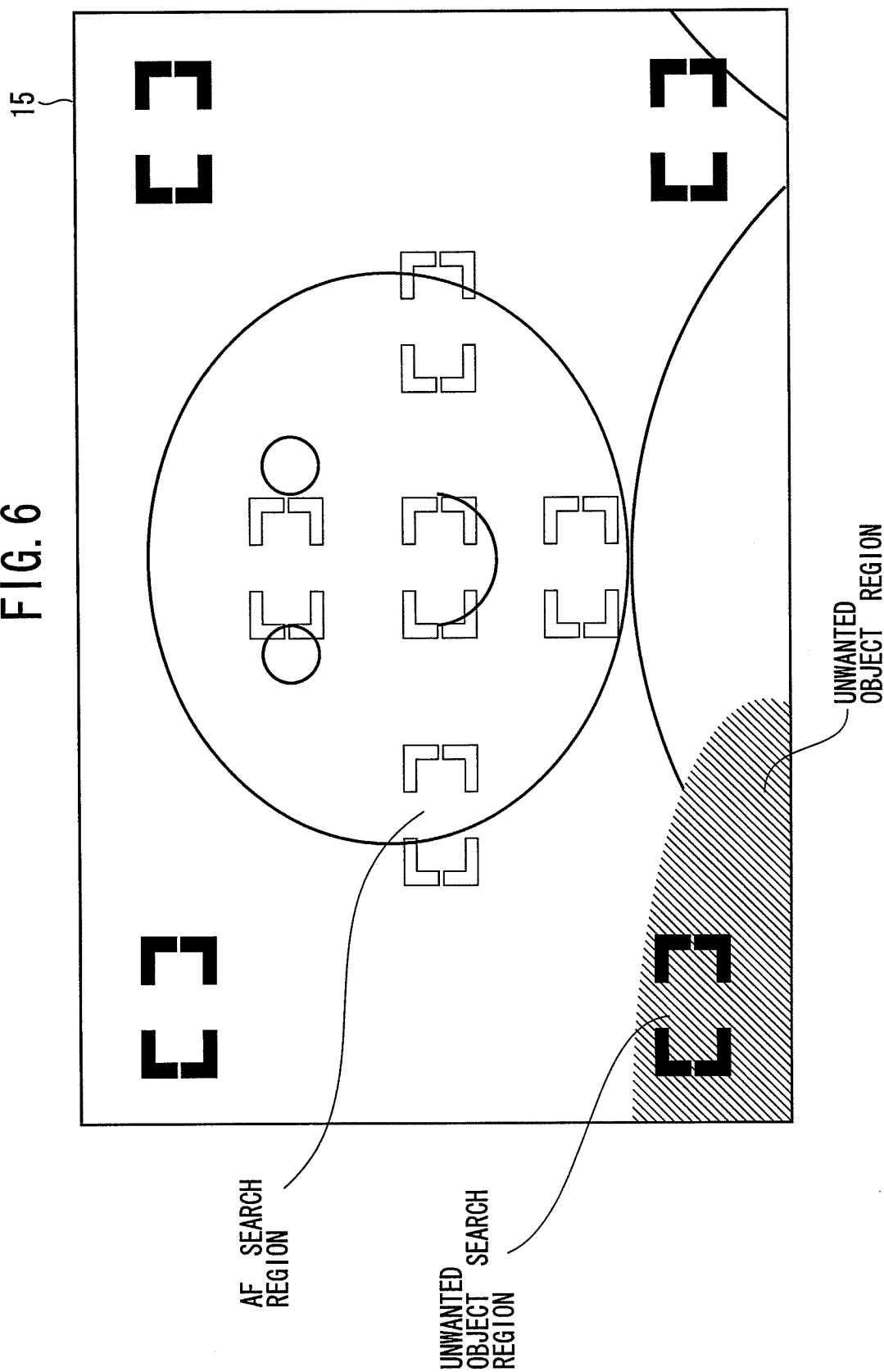

IMAGER PROCESSING A CAPTURED IMAGE

BACKGROUND OF THE INVENTION

1. Field of the Invention

The present invention relates to an imager that captures an image and processes the captured image.

2. Description of the Related Art

Japanese Unexamined Patent Application Publication No. H05-95501 discloses an imager that indicates a warning when an unwanted object, i.e. a finger, is in the angle of view. In such construction, however, an object may move while a user moves a finger out of the angle of view or changes the composition of the picture.

SUMMARY OF THE INVENTION

An object of the present invention is to provide an imager that reduces the influence of an unwanted object in a photograph and releases a shutter at the right moment.

An endoscope is provided having an imaging sensor, a focusing lens, and an image processor. The imaging sensor converts an optical image to an output image signal. The focusing lens focuses on an object. The image processor calculates a contrast value based on the image signal while the focusing lens moves to focus on an object, and in the case where the image processor detects a region in which the amount of variation in the contrast value is within a predetermined range, while the focusing lens moves in a close range around a focusing point the image processor processes at least one output image in which either the image has been cropped to exclude the region, an ornament has been added to the region, or the region has been softened.

BRIEF DESCRIPTION OF THE DRAWINGS

The objects and advantages of the present invention will be better understood from the following description, with references to the accompanying drawings in which:

FIG. 6 shows another pattern of an AF search region and an unwanted object search region.

DESCRIPTION OF THE PREFERRED EMBODIMENTS

Figure 1:
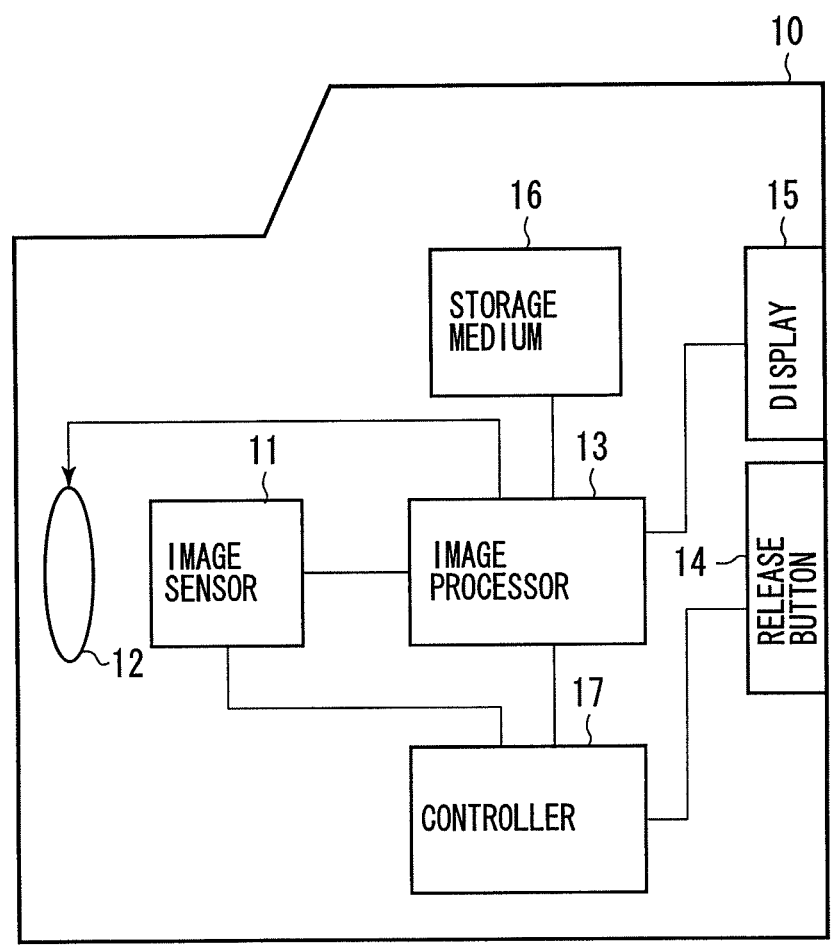
FIG. 1 is a schematic view of an imager according to the present embodiment.

The present invention is described below with references to the embodiments shown in the drawings. An imager 10 according to the embodiment shown in FIG. 1 comprises an imaging sensor 11, a focusing lens 12, an image processor 13, a release button 14, a display 15, a storage medium 16, and a controller 17.

Light reflected from an object strikes the imaging sensor 11 after passing through the focusing lens 12, so that the imaging sensor 11 captures an optical image and converts it to an electric image signal. The image processor 13 creates image data by processing the image signal. The image data is then sent to the display 15. The display 15 displays an image based on the image data. In the case the digital camera carries out such procedures for only one frame, the display 15 displays a through image. This is called as live view. The controller 17 controls each part of the digital camera 10, i.e., the image processor.

When the release button 14 is depressed halfway, the image processor 13 brings an object into focus by controlling the focusing lens 12, and calculates exposure conditions, e.g. aperture value, exposure time, etc., based on a brightness signal included in the image signal. While the focusing lens 12 is focused on an object, the image processor 13 directs the movement of the focusing lens 12 along its axis while calculating contrast values based on the brightness signal from a predetermined period. Then, when the image processor 13 determines that an object is in focus of the focusing lens 12 and the contrast value is at its maximum, the focusing lens 12 is fixed in its current position that is focused on an object.

The focusing lens 12 can focus on an object at close range from the digital camera 10, and the range in which the focusing lens 12 moves to bring the object into focus is the close focusing range. While the focusing lens 12 moves in the close focusing range, the image processor 13 determines whether or not a region exists that has a contrast value with a variation that is within a predetermined range. In other words, the image processor 13 detects whether or not a region exists in which the amount of variation in its contrast value is less than or equal to a predetermined range. The detected region, which contains an unwanted object, is described hereinafter.

Figure 5:
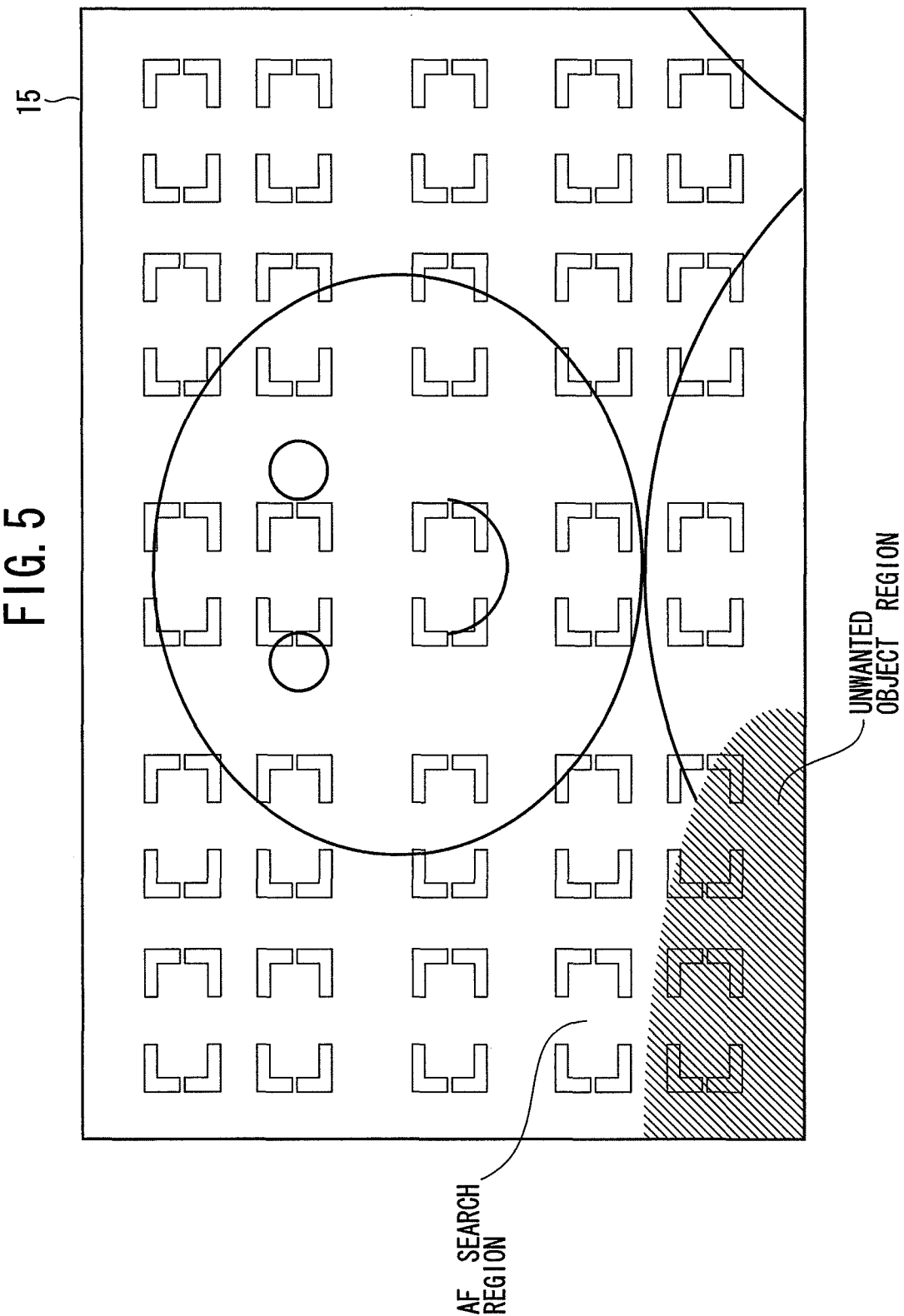
FIG. 5 shows an AF search region and an unwanted object search region.

A plurality of virtual AF search regions is provided on a captured image, as shown in FIG. 5. The image processor 13 detects the contrast values of all of these AF search regions. That is, the image processor 13 determines whether or not any of the AF search regions have a contrast value that varies within a predetermined range.

The image processor 13 detects the hue of the unwanted object region based on its contrast value and determines whether the detected hue is a predetermined hue. The predetermined hue is, for example, a flesh color or a color in the range of black to brown.

In the case that the hue of the unwanted object region is a flesh color, the image processor 13 determines that an unwanted object is in the angle of view of the focusing lens 12. For example, when a finger of a user is in front of the focusing lens 12, a finger captured in an image creates an unwanted object region because a finger is flesh-colored. In a captured image, a region in which an unwanted object exists is an unwanted object region. In the case that the hue of the unwanted object region is a color in the range from black to brown, the image processor 13 determines that an unwanted object is in the angle of view of the focusing lens 12. For example, when the back of a person's head is in front of the focusing lens 12, a head captured in an image creates an unwanted object region because the back of a head has a color in the range from black to brown.

In the case that the image processor 13 determines that a finger is in front of the focusing lens 12, the close focusing range is a relatively short distance away from the digital camera 10 that is measured in centimeters. In the case that the image processor 13 determines that the back of a person's head is in front of the focusing lens 12, the close focusing range is a relatively short distance away from the digital camera 10 that is measured in meters.

When the release button 14 is fully depressed, the focusing lens 12 remains focused on an object while the imaging sensor 11 captures an image under the calculated exposure conditions. Then, the image processor 13 creates image data by processing the image signal, and a still image based on the image data is displayed on the display 15. The image file including the image data is stored in the storage medium.

Figure 2:
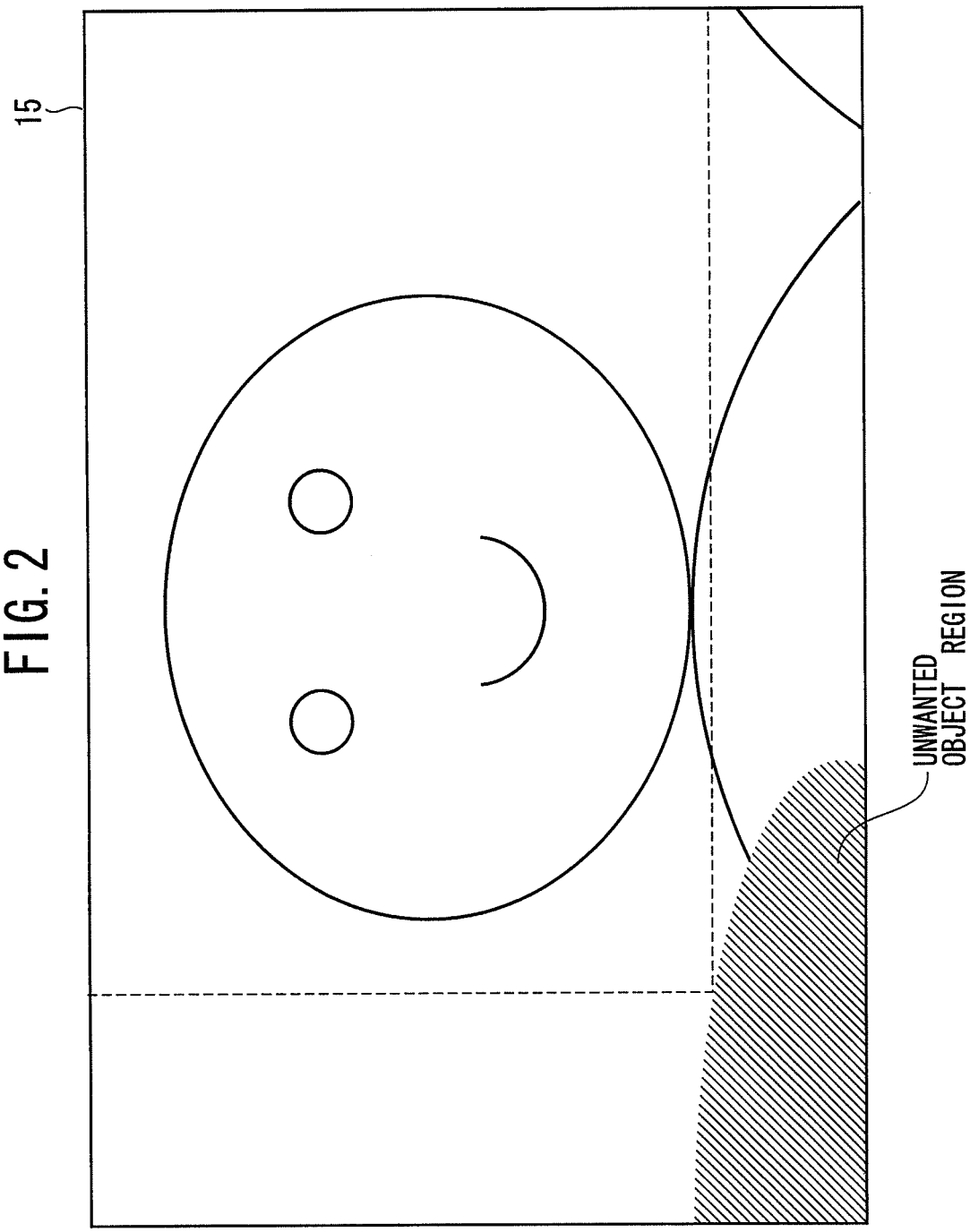
FIG. 2 shows a display that displays a through image in which an unwanted object exists.
Figure 3:
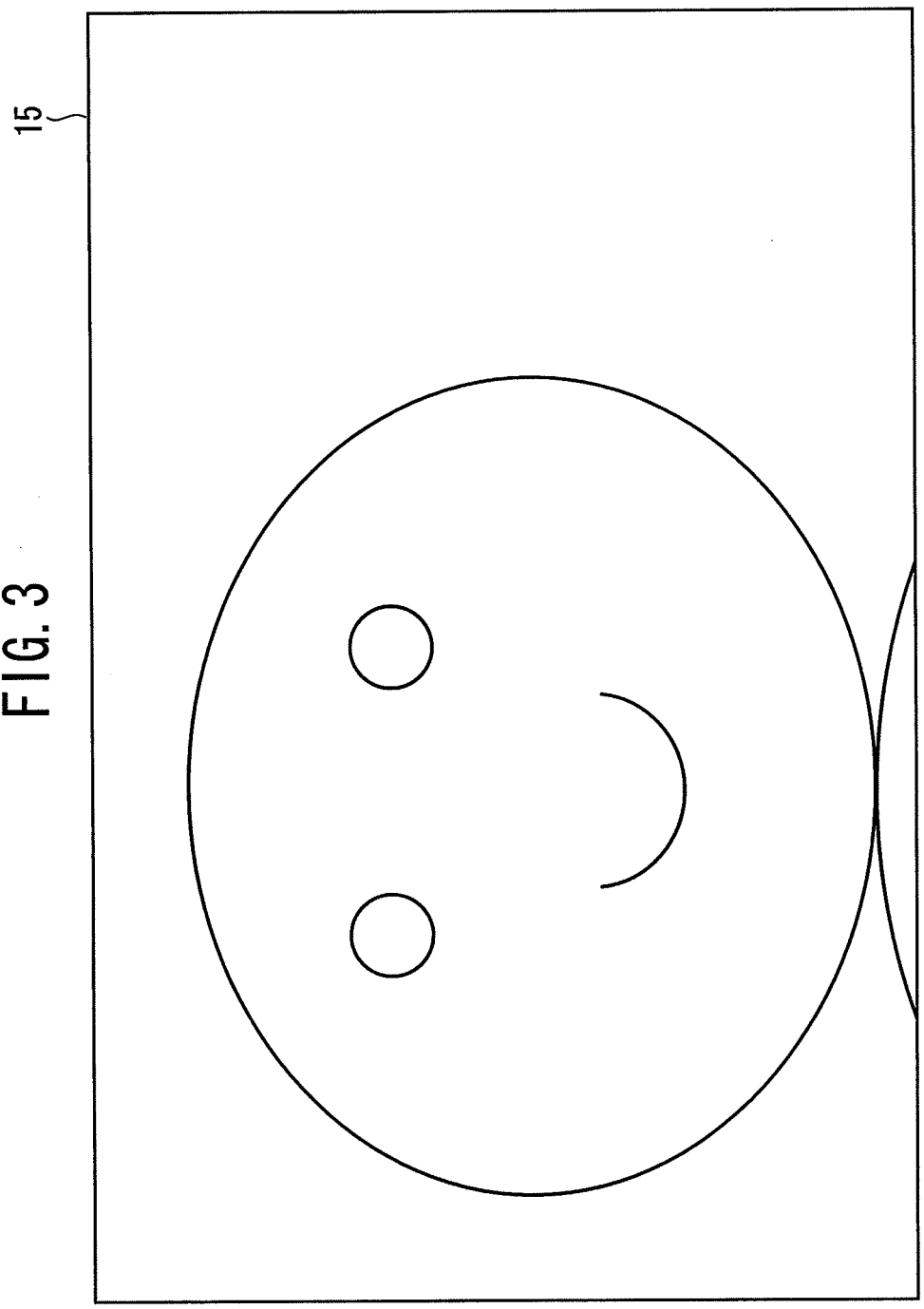
FIG. 3 shows a display that displays a still image that has been cropped to exclude the region in which an unwanted object exists.

In the case that the image processor 13 determines that a finger of a user or the back of a head is in front of the focusing lens 12, the operation mode of the digital camera 10 is set to a cropping mode. In the cropping mode, the image processor 13 crops an image to exclude the unwanted object region from the captured image, displays the cropped image on the display 15 (refer to FIG. 3), and stores the cropped image in the storage medium 16. For example, the unwanted object region is the hatched region shown in FIG. 2, and the cropped region is the upper right section of the captured image that is framed by dashed lines. Note that the image processor 13 may crop the center of a captured image so as to exclude the unwanted object region. This cropping method corresponds to a zoom-up technique.

The unwanted object region and the hue is determined after the release button 14 is depressed halfway but before it is depressed completely. Image cropping can be carried out only after an image has been captured.

Figure 4:
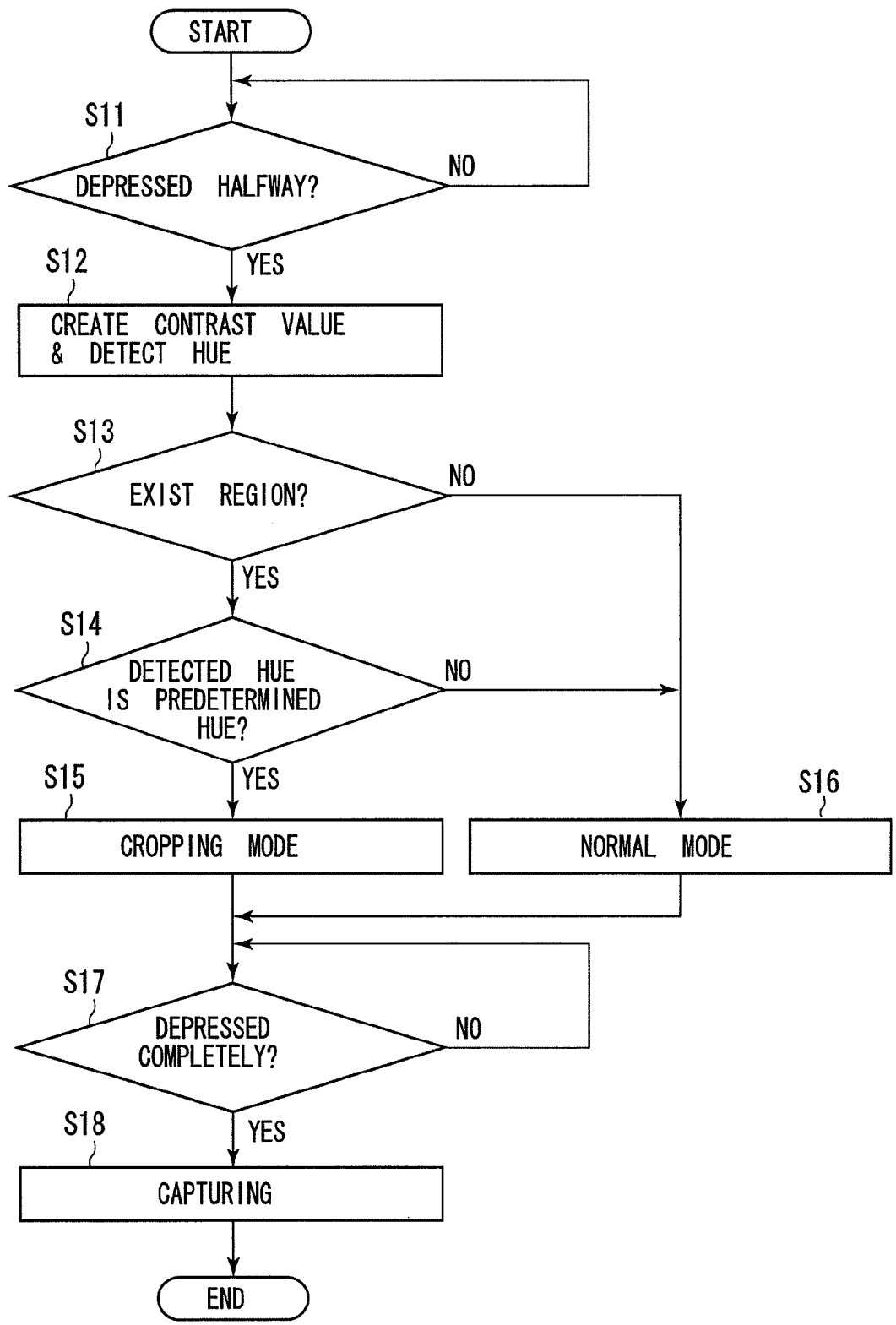
FIG. 4 is a flowchart of a cropping process.

The cropping process is described with reference to FIG. 4. When the digital camera is powered on, the controller 17 determines whether or not the release button 14 is depressed halfway in Step S11. In the case that the release button 14 is not depressed halfway, Step S11 is repeated. Otherwise, the process continues to Step S12.

In Step S12, the image processor 13 calculates exposure conditions and directs the focusing lens 12 to focus on an object. While the focusing lens 12 is focused on an object, the image processor 13 directs the movement of the focusing lens 12 along its axis and calculates a contrast value based on the brightness signal for a predetermined period so that a hue can be determined based on the calculated contrast value.

In Step S13, while the focusing lens 12 moves in the close focusing range, the image processor 13 determines whether or not an unwanted object region with a contrast value that varies within a predetermined range exists. In the case that the unwanted object region exists, the process continues on to Step S14. Otherwise, the process jumps to Step S16.

In Step S14, the image processor 13 detects the hue of the unwanted object region based on the contrast value and determines whether the detected hue is a predetermined hue, such as a flesh color or a color in the range from black to brown, for example. In the case that the hue of the unwanted object region is a predetermined hue, the process continues on to Step S15. Otherwise, the process proceeds to Step S16.

In Step S15, the image process 13 sets the operation mode of the digital camera 10 to the cropping mode. In Step S16, the image process 13 sets the operation mode of the digital camera 10 to the normal mode that is different from the cropping mode.

In Step S17, the camera controller 17 determines whether or not the release button 14 is depressed completely. In the case that the release button 14 is not depressed completely, Step S17 is repeated. Otherwise, the process continues on to Step S18.

In Step S18, while the focusing lens 12 is focused on an object the imaging sensor 11 captures an image under the calculated exposure conditions. Then, image data is created when the processor 13 processes the image signal, and a still image based on the image data is displayed on the screen 15. The image file including the image data is stored in the storage medium. In the case that the operation mode of the digital camera 10 is set to a cropping mode, the image processor 13 crops an image to exclude an unwanted object region from the captured image, displays the cropped image on the display 15 (refer to FIG. 3), and stores the cropped image in the storage medium 16.

Therefore, a still image excluding the unwanted object region is created. Note that, as a substitute for cropping, the image processor 13 may add an ornament to the unwanted object region in the process of creating a still image. The ornament may be, for example, the symbol of a heart. According to this construction, a still image is created in which a user cannot recognize the unwanted object region. As another substitute for cropping, the image processor 13 may soften an unwanted object region in the process of creating a still image.

Cropping, adding an ornament, and softening are all processes that are carried out after an image has been captured, so that the elapsed time between the moment when the release button is depressed completely and the moment of capture does not increase. Therefore, the digital camera 10 reduces the influence of an unwanted object in a photograph and releases the shutter at the right moment. Note that only one process of cropping, adding an ornament, or softening may be carried out, but two or more of these processes may also be executed for the same image.

Virtual AF search regions and unwanted object search regions may be simultaneously indicated on a captured image, as shown in FIG. 6. The image processor 13 detects the focusing point of the focusing lens 12 based on the AF search region at the center of a captured image, because the focusing point is detected at or near the center of an image. The image processor 13 detects contrast values for each of the unwanted object search regions that are provided on the periphery of a captured image, because an unwanted object is detected at or near a periphery of a captured image. The unwanted object search regions are indicated differently from the AF search regions so that an unwanted object can be rapidly detected in a short amount of time.

Steps S12 to S16 may be carried out repeatedly during each period, e.g. every millisecond until the release button 14 is completely depressed, and then the appropriate operation mode of the camera 10 may be set. In the embodiment described hereinbefore, when an unwanted object disappears from the angle of view during the period between Step S15 and S17, the operation mode of the digital camera 10 does not change to the normal mode. On the other hand, when an unwanted object appears in the angle of view between Steps S16 and S17 the operation mode of the digital camera 10 is not changed to the cropping mode. Repeating Step S12 to S16 effectively resolves such problems.

Although the embodiment of the present invention has been described herein with references to the accompanying drawings, obviously many modifications and changes may be made by those skilled in the art without departing from the scope of the invention.

The present disclosure relates to subject matter contained in Japanese Patent Application No. 2009-224147 (filed on Sep. 29, 2009), which is expressly incorporated herein, by reference, in its entirety.

The invention claimed is:

1. An imager comprising:
   an imaging sensor that converts an optical image to an output image signal;
   a focusing lens that focuses on an object; and
   an image processor that calculates a contrast value based on the image signal while said focusing lens moves to focus on an object; and
   when said image processor detects a region in which the amount of variation in the contrast value is within a predetermined focus range, while said focusing lens moves in a close focus range around a focusing point, said image processor processing at least one output image by performing at least two of a cropping operation to exclude the region, an adding operation to add an ornament to the region and a softening operation to soften the region.

2. The imager according to claim 1, wherein said image processor detects the hue of the region based on the contrast value and determines whether the detected hue is a predetermined hue, and when the detected hue is the predetermined hue, said image processor processes at least one output image to perform at least two of the cropping operation, the adding operation and the softening operation.

3. The imager according to claim 2, wherein the close focus range around a focusing point is determined based on a hue of the image.

4. The imager according to claim 2, further comprising a release button that is depressed halfway so as to focus on a object, and that is depressed completely so as to convert an optical image to an output image signal, and if said image processor detects a region after said release button is halfway depressed but before said release button is fully depressed, said image processor processes an image signal that is generated after said release button is fully depressed.

5. The imager according to claim 2, wherein the predetermined hue is a color in the range of black to brown.

6. The imager according to claim 2, wherein the predetermined hue is a flesh color.

7. The imager according to claim 2, wherein, when the predetermined hue is a flesh color, the close focus range is a first focus range and when the predetermined hue is a color in the range of black to brown, the close focus range is a second focus range that is larger than the first range.

8. The imager according to claim 7, wherein the second focus range is greater than the first range by a factor of about 10.

9. The imager according to claim 1, wherein said image processor calculates a contrast value based on a perimeter section of the image corresponding to the image signal, and when said image processor detects the region in the perimeter section, said image processor processes at least one output image to perform at least two of the cropping operation, the adding operation and the softening operation.

10. The imager according to claim 9, wherein said image processor calculates a focusing point of said focusing lens based on a contrast value in the perimeter section of the image, and said focusing lens focuses on an object based on the focusing point.

11. The imager according to claim 9, wherein said image processor calculates a focusing point of said focusing lens based on a contrast value in a section other than the perimeter section of the image, and said focusing lens focuses on an object based on the focusing point.

12. The imager according to claim 1, wherein the region is detected after a release button is halfway depressed and the processing of the at least one output image is performed after the release button is fully depressed.

13. The imager according to claim 1, wherein the image processor crops the image to exclude the region by modifying two orthogonal dimensions of the image.

14. An imager comprising:
an imaging sensor that converts an optical image to an output image signal;
a focusing lens that focuses on an object; and
an image processor that calculates a contrast value based on the image signal while said focusing lens moves to focus on an object; and
wherein, when said image processor detects a region in which the amount of variation in the contrast value is within a predetermined focus range, while said focusing lens moves in a close focus range around a focusing point, said image processor processing at least one output image in which either the image has been cropped to exclude the region, an ornament has been added to the region, or the region has been softened; and
when said image processor processes at least one output image in which the image has been cropped to exclude the region, the image processor sets an operation mode of the imager to a cropping mode before a complete depression of a release button, and crops the image to exclude the region after the complete depression of the release button.

15. The imager according to claim 14, wherein said image processor detects the hue of the region based on the contrast value and determines whether the detected hue is a predetermined hue, and when the detected hue is the predetermined hue, said image processor processes at least one output image in which either the image has been cropped to exclude the region, an ornament has been added to the region, or the region has been softened.

16. The imager according to claim 15, wherein the close focus range around a focusing point is determined based on a hue of the image.

17. The imager according to claim 15, further comprising a release button that is depressed halfway so as to focus on a object, and that is depressed completely so as to convert an optical image to an output image signal, and if said image processor detects a region after said release button is halfway depressed but before said release button is fully depressed, said image processor processes an image signal that is generated after said release button is fully depressed.

18. The imager according to claim 14, wherein said image processor calculates a contrast value based on a perimeter section of the image corresponding to the image signal, and when said image processor detects the region in the perimeter section, said image processor processes at least one output image in which either the image has been cropped to exclude the region, an ornament has been added to the region, or the region has been softened.

19. The imager according to claim 18, wherein said image processor calculates a focusing point of said focusing lens based on a contrast value in the perimeter section of the image, and said focusing lens focuses on an object based on the focusing point.

20. The imager according to claim 18, wherein said image processor calculates a focusing point of said focusing lens based on a contrast value in a section other than the perimeter section of the image, and said focusing lens focuses on an object based on the focusing point.

* * * * *